United States Patent
Peacock et al.

[15] 3,672,136
[45] June 27, 1972

[54] MOWER CONDITIONER

[72] Inventors: Peter J. Peacock, Western Springs; Paul C. Gordon, Hinsdale, both of Ill.

[73] Assignee: International Harvester Company, Chicago, Ill.

[22] Filed: Sept. 21, 1970

[21] Appl. No.: 73,923

[52] U.S. Cl. ..............................56/14.4, 56/503, 56/DIG. 1
[51] Int. Cl. .......................................................A01d 49/00
[58] Field of Search ..............56/14.1, 14.2, 1, 6, 503, DIG. 1

[56] References Cited

UNITED STATES PATENTS 3,546,861  12/1970  Clendenin............................56/DIG. 1

3,391,522  7/1968  Zweegers......................................56/6

FOREIGN PATENTS OR APPLICATIONS 263,432  7/1968  Austria...................................56/503

Primary Examiner—Antonio F. Guida
Attorney—Floyd B. Harman

[57] ABSTRACT

A mower conditioner having rotary cutters arranged in pairs, each pair cutting the crops in front thereof and throwing the cut crops rearwardly to a pair of short length, vertically inclined, crushing rollers which in turn discharge the crops against the underside of a deflector by which the crops are fluffed and deposited upon the field.

10 Claims, 8 Drawing Figures

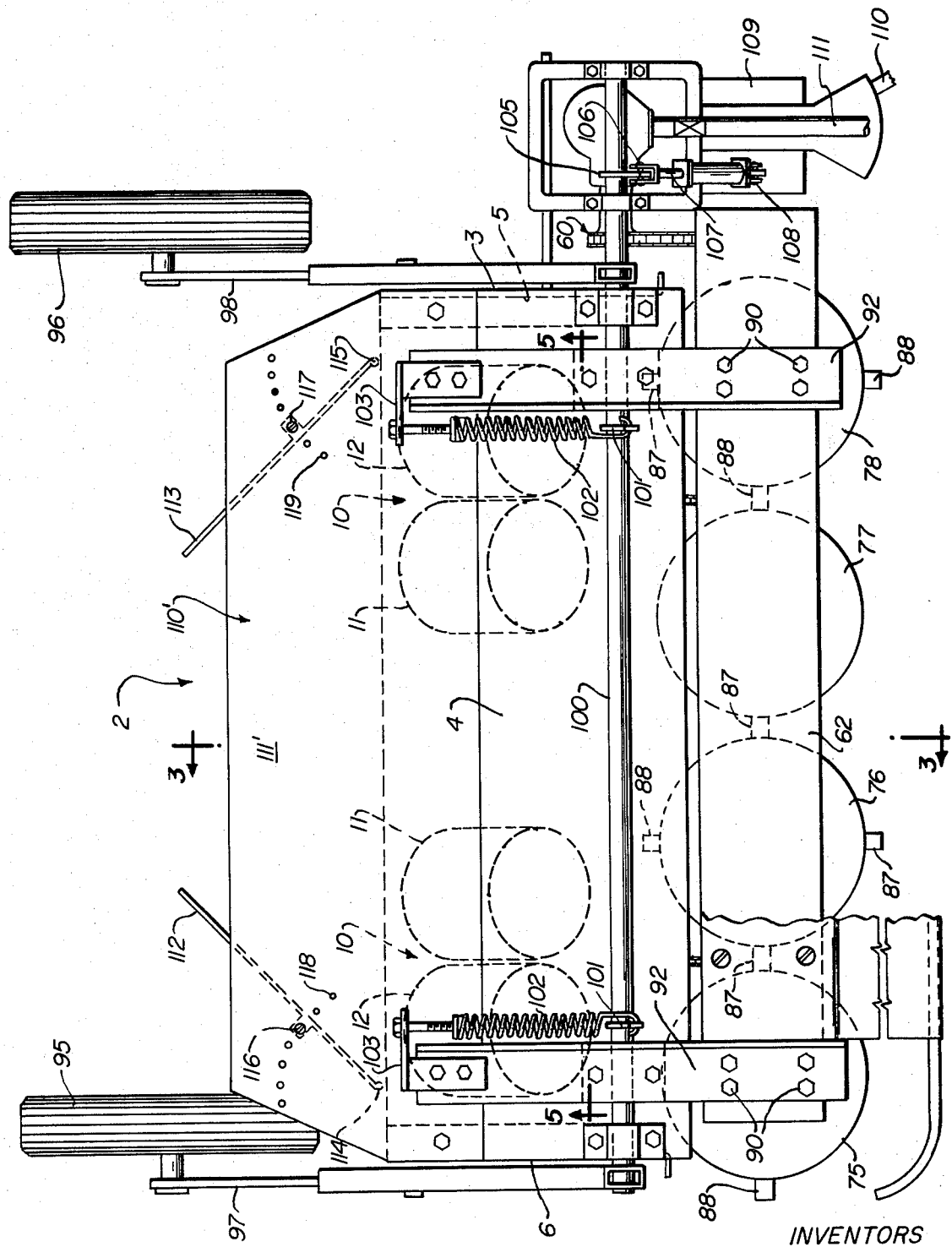

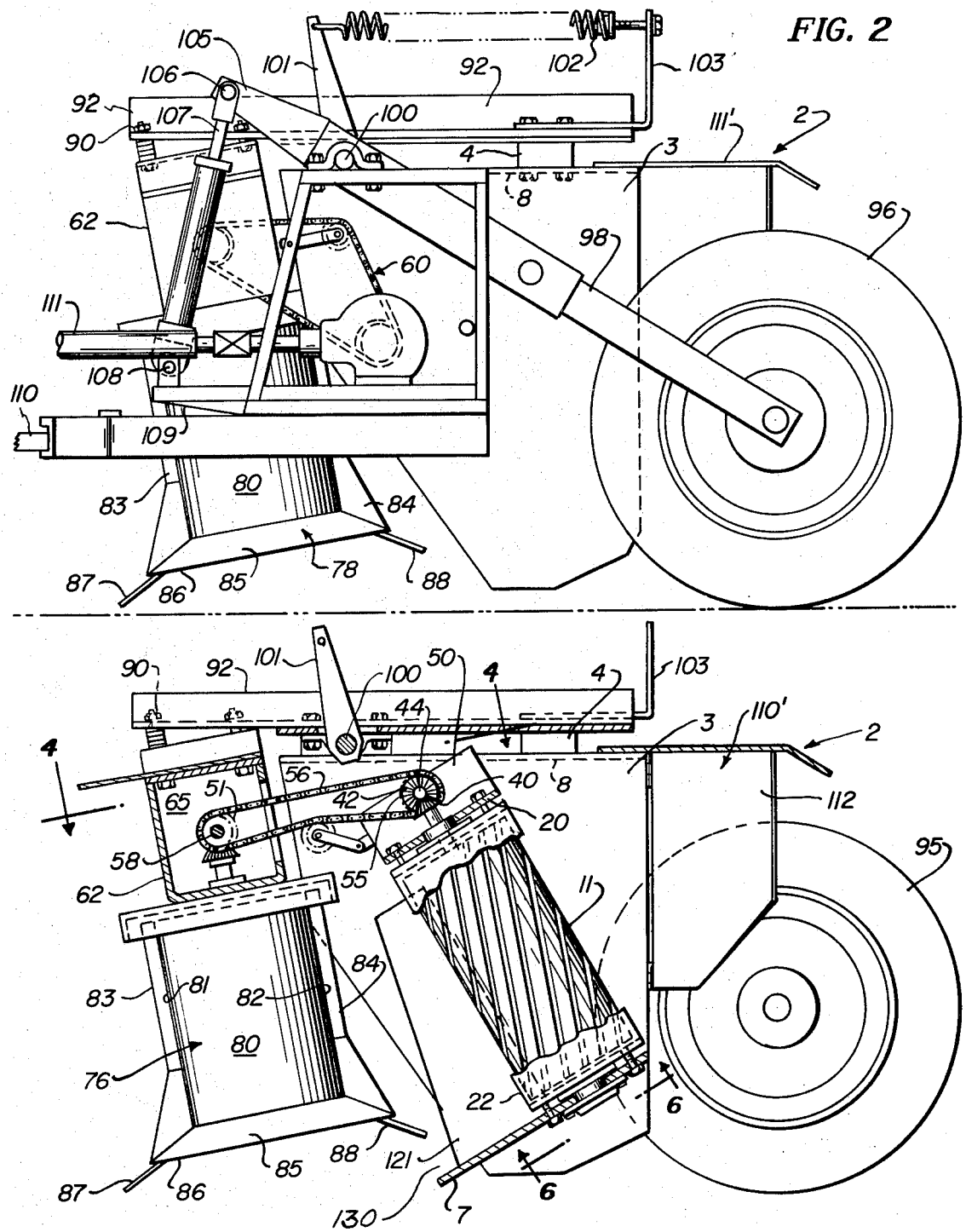

INVENTORS
Peter J. Peacock
Paul C. Gordon

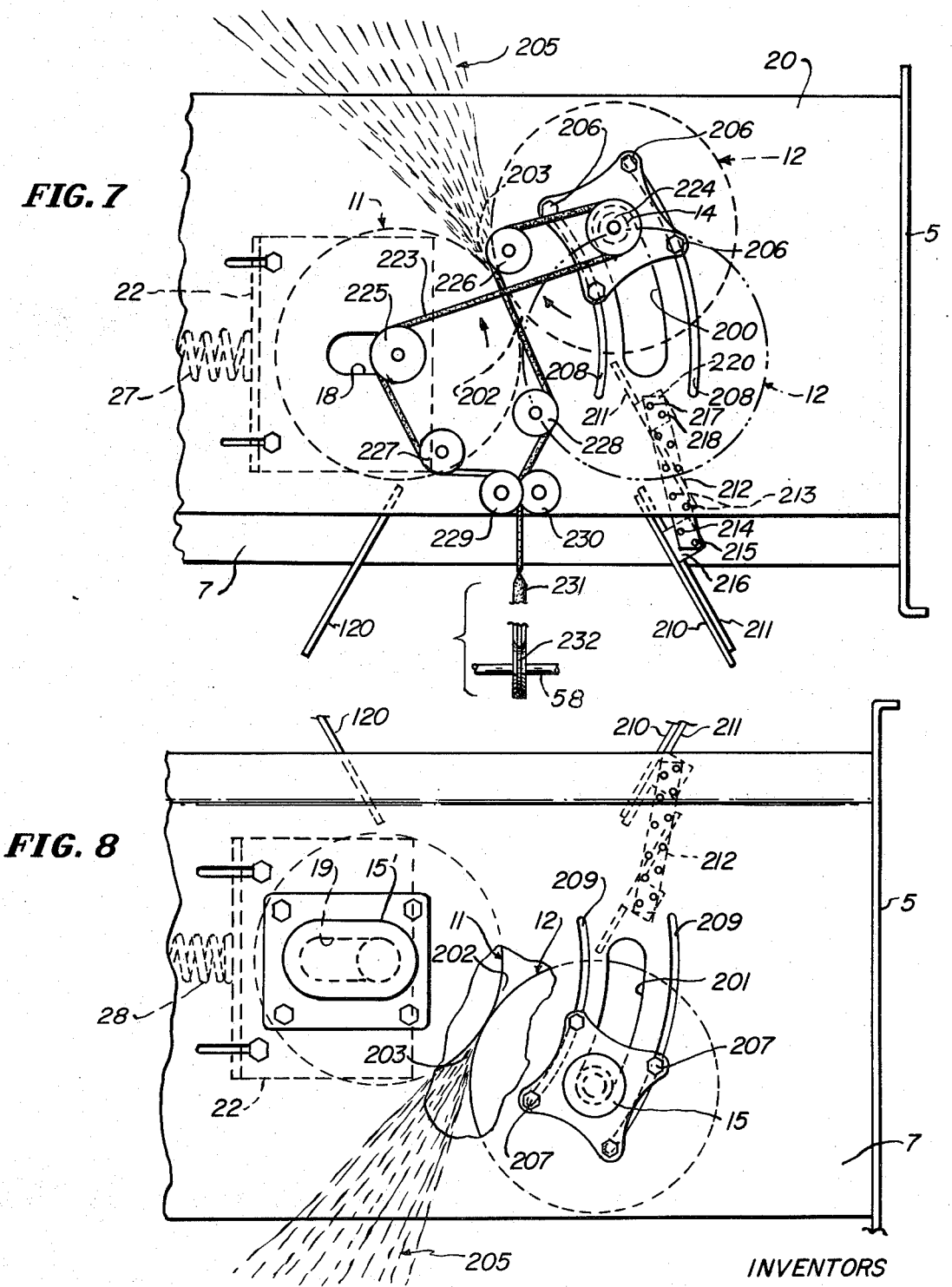

MOWER CONDITIONER

CROSS-REFERENCES TO RELATED APPLICATIONS

Attention is directed to companion applications of Thomas J. Scarnato et al., Ser. No. 31110 filed Apr. 23, 1970 and Thomas J. Scarnato et al., Ser. No. 31111 filed Apr. 23, 1970.

DISCUSSION OF THE PRIOR ART

The prior art devices use sickle type mowers and these have had to be aided by large reels which are expensive and of complex nature, in order to move the crop material from the sickle to the hay conditioning rollers. The hay conditioning rollers have been horizontally positioned and being from 7 to 9 feet in length, require a bulky structure of expensive construction to hold the rolls in proper mating relationship and prevent their bowing or sagging. This in turn requires massive supporting framework, excess power for driving the rollers and pulling the machine through the fields.

SUMMARY OF THE INVENTION

The instant invention is directed to a novel mower conditioner device which incorporates pairs of rotary cutters operated to cut the field borne crops and to gather the crops therebetween and then discharge the crops rearwardly into short length, light weight, and relatively inexpensive rollers.

The present invention is particularly directed to an organization wherein such rotary cutting devices are associated with a pair of vertically oriented, inclined conditioning rollers of relatively short length which are operative to receive the material being discharged by the cutters and to crush and discharge the crushed material in association with a windrowing mechanism into a windrow.

A general object of the invention is to provide a novel combination of rotary cutting means and crushing means which is relatively inexpensive and which is easily adjustable to terrain and field conditions.

A further object of the invention is to provide a novel mower conditioner in which the mowing means are arranged to operate in downwardly forwardly sloping planes and adapted to cut and pick the material and fling the material upwardly and rearwardly onto a pair of conditioning rollers which are operative on diagonal forwardly and upwardly inclined axes.

A still further object of the invention is to provide a novel floating arrangement for mounting rotary cutters from the basic units which incorporates the hay conditioning rollers and the wheel and axle assembly for raising and lowering the unit between operating and transport positions.

These and other objects and advantages inherent in and encompassed by the invention will become more readily apparent from the specification and the drawings wherein:

FIG. 1 is a plan view partially broken away of the novel mower conditioner;

FIG. 2 is a side elevational view thereof;

FIG. 3 is a sectional view taken substantially on the line 3—3 of FIG. 1;

FIG. 7 is a fragmentary top plan view of a modification of the invention; and

FIG. 8 is a bottom plan view of the structure of FIG. 7.

DESCRIPTION OF THE INVENTION FIGURES 1-6

Figure 4:
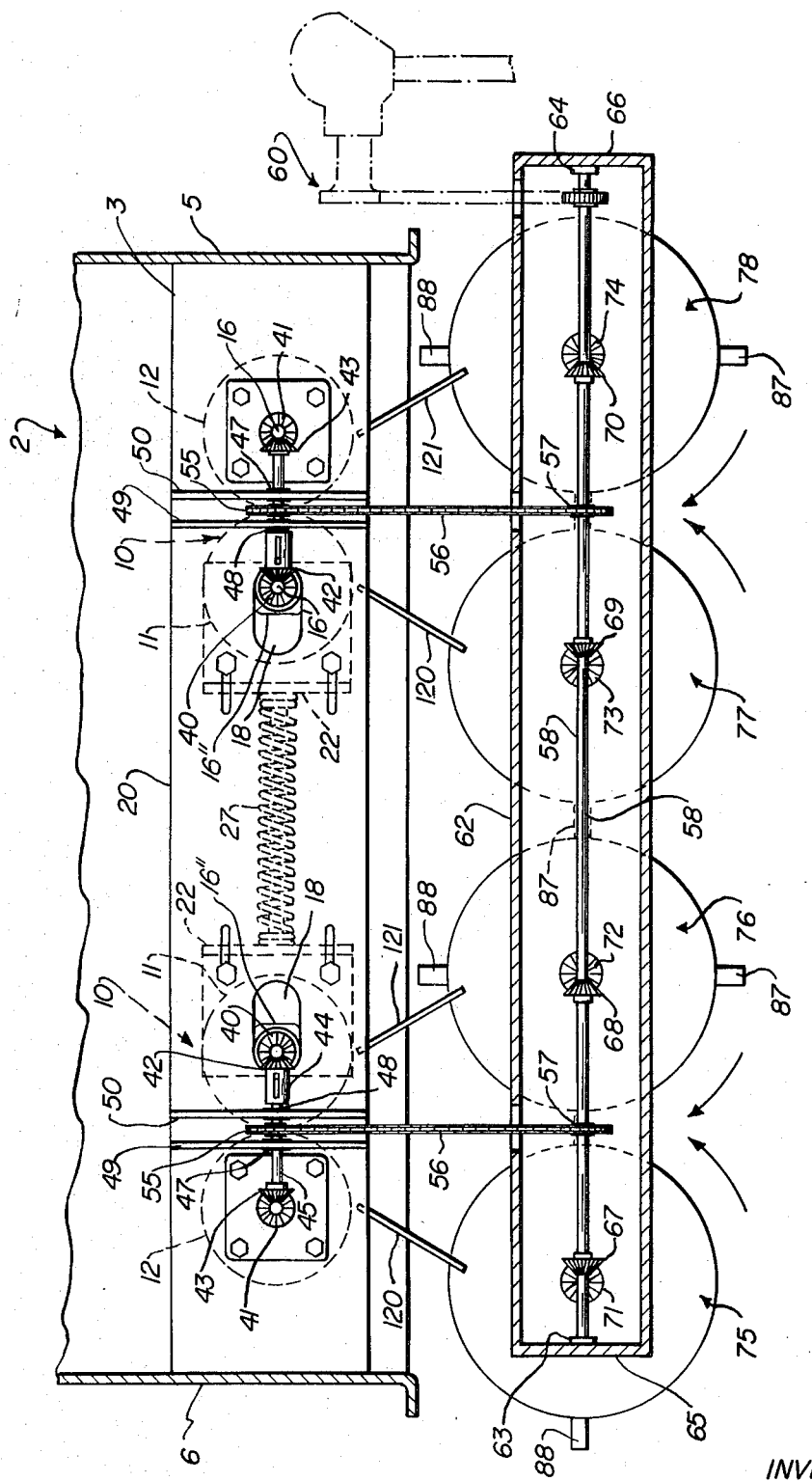
FIG. 4 is a sectional view taken substantially on the line 4—4 of FIG. 3.
Figure 5:
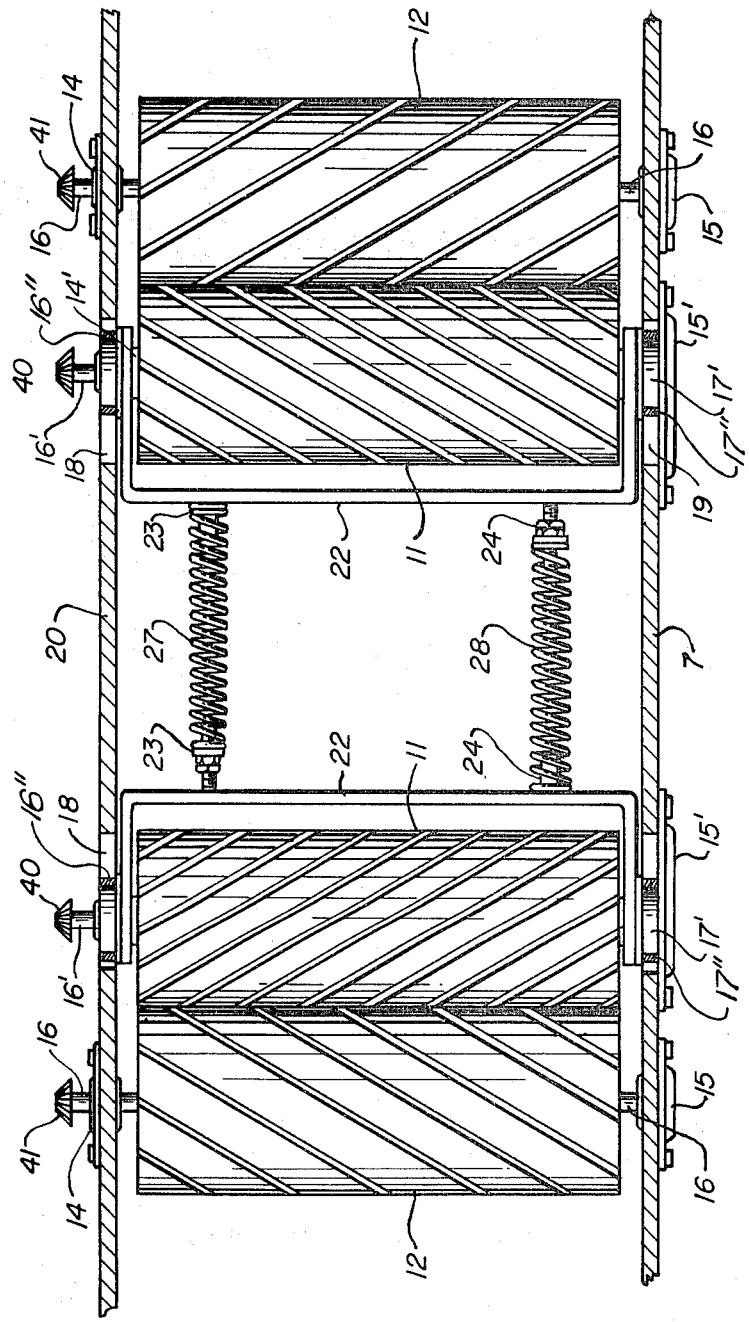
FIG. 5 is a sectional view taken generally on the line 5—5 of FIG. 1.
Figure 6:
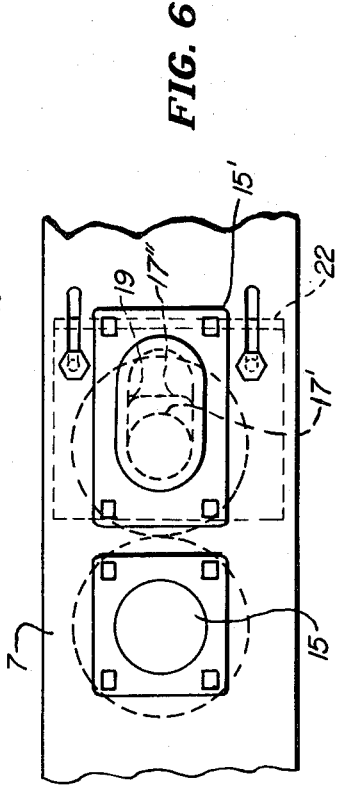
FIG. 6 is a fragmentary bottom end view of the stationary roller mounting taken substantially on line 6—6 of FIG. 3.

The mower-conditioner generally designated 2 comprises a frame structure 3 which has a transverse frame member 4 interconnecting vertical side plates or panels 5 and 6 which adjacent their lower ends are interconnected by a transverse downwardly and forwardly inclined deck plate 7 and adjacent to their upper ends by a plate 8.

Pairs of hay conditioner rollers 10, 10 are spaced transversely of the harvester and disposed between the upper and lower plates 8 and 7 and rotatable on upwardly and forwardly sloping axes. Each pair of rollers 10 comprises a movable roller 11 and a stationary roller 12 and each stationary roller is provided with bearings 14 and 15 at its upper and lower ends mounted its shaft 16. The bearings are fixed to the members 20 and 7. Roller 11 has a shaft 16' with bearings 14' and 15' mounted on slide blocks 16'' and 17'' which are supported within slide ways 18 and 19 in the top support and guide member 20 and bottom plate 7 which interconnect the side walls 5 and 6 of the framework 2. The blocks 16'' and 17'' are interconnected by a spanner 22 on which are provided adjustable seats at 23 and 24 which position one of the ends of compression springs 27 and 28. The springs in expanding urge the respective spanner elements 22 away from each other and thus bias the rollers 11 into engagement with the respective stationary rollers 12.

The upper ends of pairs of rollers 11 and 12 are provided with bevel gears 40 and 41 on the shafts 16' and 16 respectively. These gears mate with companion bevel gears 42 and 43 which are mounted on opposite ends of a spring loaded shaft 44 which is journaled in bearings 47 and 48 on supports 49 and 50 on the upper support member 20. The sleeve shaft 44 is provided intermediate its ends with a sprocket 55 which is driven by a chain 56 which is trained about a sprocket 57 connected to a transverse drive shaft 58 of a power train for driving the rotary mowing devices generally designated 60.

The shaft 58 as best seen in FIG. 4 is housed in a transverse box-section beam member 62 and is provided with journals 63 and 64 in opposite end walls 65 and 66 which close the ends of the box section beam member 62. The shaft 58 carries a plurality of beveled gears 67, 68 and 69, 70 which respectively mesh with bevel gears 71 and 72 and 73 and 74. The gear 71 drives the rotor 75, gear 72 drives the rotor 76, gear 73 drives the rotor 77 and the gear 74 drives rotor 78. The cutters or rotors 75 through 78 are each of identical construction and therefore identical parts will be identified with the same reference numeral. Each cutter comprises a generally cylindrical drum 80 with chordally arranged diametrically opposite side walls 81, 82 on which there are provided slinger blades 83, 84 extending substantially radially outwardly and at their lower ends merging into the frusto-pyramidal top surface 85 of a balde-carrying annular member 86 to which are pivotally connected a plurality of outwardly extending cutter blades 87 and 88.

The beam member 62 is connected by bolts 90, 90 to fore and aft extending beam members 92, 92 of the main frame structure 2.

The entire unit is supported by a pair of wheels 95 and 96 which are connected to the rear ends of arms 97 and 98, the forward ends of the arms being connected to a rockshaft 100 which is connected intermediate its ends to upstanding lever arms 101. Each arm 101 is connected to a forward end of a counterbalancing spring 102, the rear end of which is connected to a bracket 103 which in turn is connected to the framework 2, and in the present instance is shown as being connected to an adjacent beam member 92. The rockshaft 100 is also provided with an upwardly and forwardly extending lever arm 105 which is connected as at 106 to the upper end of a ram 107, the ram being connected at its lower ends as at 108 to a draft frame structure 109 which is adapted for connection via tongue 110 to the tractor drawbar. The frame 109 supports a drive train 111 from the tractor to shaft 58.

The unit is provided with a windrowing mechanism generally designated 110 comprising a top shield 111' and a pair of side shields 112 and 113 which are swingable about vertical axes 114 and 115. Maintaining of an adjustment is by means of a series of bolts 116 and 117 which interconnect through a series of bolt holes 118 and 119 in the shield 111' with respective side shields 112, 113.

It will be apparent that the present structure provides a simple and effective mechanism for cutting and conditioning forage crops and utilizes cutter component which is relatively easy to maintain and which is adapted to cut crops in practically any condition regardless of whether the crop is standing or lodged. Furthermore the respective cooperative rollers are of short length and of relatively light weight and are so oriented as to accept the crops from respective pairs of cutters 60 which rotate in the direction of the arrows as best seen in FIG. 4 whereby the material is gathered between the cutters and with the assistance of the respective paddles is thrown rearwardly between the rearwardly converging guide shields 120 and 121. The forward ends of the shields overlap the rear portions of the respective cutters, that is the portions 86 thereof, and serve as a means for scraping the cutters clean to prevent them from recirculating the material.

Thus a novel and effective and efficient mechanism is provided which is simple, durable, and which gathers the material directly from the field and throws it across the gap 130 over the bottom plate structure into the nip of the hay conditioning rollers.

DESCRIPTION OF FIGURES 7-8

In this embodiment parts which correspond to the previous embodiment are identified by the same reference numerals.

It will be observed that the rollers 11 and 12 are mounted between the top and bottom plates 20 and 7 and that roller 12 in this instance is positionable in the arcuate slots 200 and 201 in members 7 and 20 to change the position of the intake bite 202 and the discharge throw area 203 of the rollers 11 and 12 so that the trajectory of the discharging material 205 is controlled to discharge rearwardly or inwardly toward the stream of material being discharged by the adjacent pair of rollers 11, 12 as seen in FIG. 4, for example. It will be understood that the illustration in FIGS. 7 and 8 show only one half of the structure, the other half being of identical or reverse symmetry.

The bearings 14 and 15 of roller 12 are secured by bolt and nut assemblies 206 and 207 respectively which are positionable in concentric slots 208, 208 and 209, 209 respectively in the members 20 and 7.

The slots 200 and 201 are concentric with the axis of the shaft 16' of the companion roller 11 and the guide shield 210 has an extensible section 211 to accommodate the various positions of its associated roller 12. The rear section 211 is connected to the companion forward shield element 210 by struts 212 which have series of holes 213 therein which receive pins 214, 215 securing the front end portion thereof to bracket 216 on the back of plate 210 and the rear end portion of the strap 212 is secured by pins 217, 218 extending through appropriate openings 213 and vertically aligned openings in the brackets 220 on the back sides of plate 211.

The drive for the rollers may be a suitable lacing of belting 223 about pulleys 224, 225 connected to shafts 16, 16' of the rollers 11 and 12 and suitably positioned guiding and tightening pulleys 226, 227, 228, 229 and 230 and the belt may be twisted at 231 and trained about a drive pulley 232 on shaft 58 in substitution for sprocket 57.

Thus a novel mechanism has been provided to control and to form either a windrow or a swath depending upon the placement of the cooperating crushing rollers.

In such arrangement the windrow sheets 112 and 113 of the previous embodiment may be eliminated and the roller assemblies positioned either to converge the streams of crushed material to form a windrow or to discharge directly rearwardly to form a swath. The angle of convergence will determine if the windrow is loose or tight and its width. The placement of the windrow can also be determined, that is if the leftward set of rollers is positioned to discharge straight back and the rightward set to discharge leftwardly, the window will form left of center. For a rightward placement the rightward set of rollers would be positioned to discharge rearwardly and the leftward set would be angled rightwardly. If the windrow is to be centered then both sets of rollers would be angled to discharge at the same angle toward each other. Various other positions and arrangements of the windrow are possible by selectively positioning each roller assembly as desired.

What is claimed is:

1. A mower conditioner apparatus comprising a frame, a pair of rotary cutting means mounted on the forward end of the frame for cutting field borne crops, means associated with cutting means for slinging cut crops from the cutting means rearwardly therefrom, means for rotating said pair of cutting means toward each other on their forward sides and away from each other on their rear sides, a pair of cooperating generally upright crushing rollers mounted on the frame in fore and aft alignment with the pair of rotary cutting means and spaced a substantial distance rearwardly therefrom, and having an intake nip in intercepting relation to the trajectory of cut crops from said cutting means and having a rearward crop discharge trajectory, and a platform extending under the rollers and spaced from and projecting beneath the cutting means and defining a gap beneath the cutting means for accommodating the discharge of foreign material immediately behind the cutting means and below the platform.

2. The invention according to claim 1 and said means for slinging the cut crops comprising drums, and the cutting means comprising radial blades on the lower ends of the drums, said drums defining a crop intake therebetween and effective to grasp the material and convey the cut crop material therebetween.

3. The invention according to claim 1 wherein said cutting means are positioned to cut in a plane convergingly with the ground over which the apparatus operates forwardly of the apparatus.

4. The invention according to claim 3 and said rollers operating on axes sloping upwardly and forwardly.

5. The invention according to claim 1 and guide means comprising a pair of plates converging from respective cutting means to said rollers.

6. The invention according to claim 1 and said platform being disposed below said rollers and inclined upwardly and rearwardly and having a front portion underposed with respect to the rear portions of said cutter means.

7. The invention according to claim 1 and means for adjusting the inclination of the cutting means relative to the frame for changing the delivery trajectory of the cut crops to the associated rollers.

8. The invention according to claim 1 and means for conjunctively changing the inclination of the cutting means and rollers with respect to each other and to the ground.

9. In a mower conditioner having transversely disposed cutting means along its forward edge, hay conditioning means behind the cutting means for receiving cut hay therefrom, each said conditioning means comprising a pair of cooperatively disposed rollers rotatable about generally upright axes, and means for relatively adjusting the rollers of each pair to vary the position of the intake nip and the discharge area thereof whereby the cut crop is adapted to be positioned by controlling the discharge trajectory thereof.

10. The invention according to claim 9 and said conditioning means arranged in sets comprising two adjacent pairs of rollers, and one of the rollers of each pair selectively positionable about the axis of the other roller of the pair.

* * * * *